United States Patent
Jensen (10) Patent No.: US 6,421,406 B1
(45) Date of Patent: Jul. 16, 2002

(54) CORE SPRAY UPPER T-BOX TO SAFE END ATTACHMENT

(75) Inventor: Grant Clark Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,264

(22) Filed: Mar. 12, 2001

(51) Int. Cl.$^7$ .......................... G21C 15/00; F16L 55/10
(52) U.S. Cl. ...................... 376/352; 376/204; 376/282; 376/292; 138/89; 138/97
(58) Field of Search .................... 376/282, 352, 376/362, 364, 178, 203, 204, 291, 292; 138/89, 97; 29/890

(56) References Cited

U.S. PATENT DOCUMENTS

| | | | |
|---|---|---|---|
| 4,168,071 A | 9/1979 | Jacobson et al. | 277/606 |
| 4,198,272 A * | 4/1980 | Salmon | 376/352 |
| 4,834,935 A | 5/1989 | Daigle et al. | 376/292 |
| 4,859,403 A | 8/1989 | Dixon et al. | 376/286 |
| 5,345,484 A | 9/1994 | Deaver et al. | 376/407 |
| 5,568,527 A * | 10/1996 | Richardson et al. | 376/245 |
| 5,735,551 A | 4/1998 | Whitman et al. | 285/15 |
| 5,737,380 A | 4/1998 | Deaver et al. | 376/352 |
| 5,785,361 A | 7/1998 | Bourbour et al. | 285/382 |
| 5,901,192 A | 5/1999 | Deaver et al. | 376/282 |
| 5,912,936 A | 6/1999 | Charnley et al. | 376/282 |
| 5,947,529 A | 9/1999 | Jensen | 285/123.6 |
| 6,000,731 A | 12/1999 | Charnley et al. | 285/319 |
| 6,131,962 A | 10/2000 | Jensen et al. | 285/337 |
| 6,195,892 B1 * | 3/2001 | Weems et al. | 29/890.031 |
| 6,201,847 B1 | 3/2001 | Jensen et al. | 376/352 |

* cited by examiner

Primary Examiner—Michael J. Carone
Assistant Examiner—Daniel Matz
(74) Attorney, Agent, or Firm—Armstrong Teasdale LLP (57) ABSTRACT

A T-box assembly includes a T-box housing, a thermal sleeve coupled to the T-box housing, a cruciform wedge, a spider threadedly engaging the thermal sleeve, and a draw bolt coupling the cruciform wedge and the spider. At least one spring washer is located between the end of the thermal sleeve and the end of a core spray nozzle safe end. The T-box housing includes a cover opening having a plurality of breach lock lugs extending into the cover opening. A T-box cover plate includes a head portion and an insertion portion. A plurality of breach lock lugs extend from the periphery of the insertion portion. A plurality of ratchet teeth extend around the periphery of the head portion. A lock spring includes an engagement portion having a plurality of ratchet teeth sized to mesh with cover plate ratchet teeth.

22 Claims, 7 Drawing Sheets

CORE SPRAY UPPER T-BOX TO SAFE END ATTACHMENT

BACKGROUND OF THE INVENTION

This invention relates generally to nuclear reactors and more particularly, to assemblies and methods for coupling core spray line assemblies within such reactors.

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spargers inside the RPV and to cool the core. Typically, the core spray piping is coupled to a thermal sleeve which is welded to a RPV nozzle, or safe end.

Stress corrosion cracking (SCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Reactor internal piping, such as thermal sleeves and core spray lines, occasionally requires replacement as a result of SCC. Replacing the core spray piping often requires removing the core spray line from the RPV nozzle safe end. Because the spray line is welded to the safe end, removing the spray line from the safe end often damages, or breaks, the safe end. To replace the safe end, the reactor must be drained to an elevation below that of the safe end. The safe end is then cut off and a replacement is welded to the RPV. Thereafter, the replacement core spray line is welded to the replacement safe end. Replacing a safe end is time consuming and tedious.

It would be desirable to provide an assembly which facilitates replacing core spray lines without removing the reactor pressure vessel safe end. It also would be desirable to provide such an assembly which is easily removed and installed without the necessity of welding.

SUMMARY OF INVENTION

A T-box assembly, for attachment to a core spray nozzle safe end in a boiling water nuclear reactor pressure vessel, in an exemplary embodiment, includes a T-box housing, a thermal sleeve coupled to the T-box housing, a cruciform wedge configured to engage an inside surface of the bore of the core spray nozzle safe end, a spider threadedly engaging the thermal sleeve, and a draw bolt coupling the cruciform wedge and the spider. At least one spring washer is located between the end of the thermal sleeve and the end of the core spray nozzle safe end. The T-box housing includes three ends. The first end is coupled to the thermal sleeve, and the other two ends are configured to be in substantial alignment with each other and couple to core spray line header pipes. The T-box housing also includes a cover opening sized to receive a cover plate, and that is in substantial alignment with the first end. T-box housing further includes a plurality of breach lock lugs extending into the cover opening.

The T-box cover plate includes a head portion and an insertion portion. The insertion portion includes a plurality of breach lock lugs extending from the periphery of the insertion portion. The insertion portion breach lock lugs are sized and located to mesh with the T-box housing breach lock lugs to capture the cover in place. A plurality of ratchet teeth extend around the periphery of the head portion.

The T-box housing further includes a recess located adjacent the cover opening. The recess is sized and shaped to receive a lock spring. The lock spring includes an engagement portion having a plurality of ratchet teeth sized to mesh with cover plate ratchet teeth.

The cruciform wedge includes a central member having a bore extending therethrough. Four web members extend from the central member. The web members are configured so as to form an X shaped configuration. Two support members extend between the ends of adjacent web members with a first support member extending between the first and second web members, and a second support member extending between the third and fourth web members. The support members engage the bore of the core spray nozzle safe end.

The draw bolt includes, at one end, a cap portion having a larger diameter than the diameter of the bore through the cruciform wedge central member. The other end is threaded and sized to threadedly engage a draw bolt nut.

The spider includes a cylindrical shell with one end portion configured to engage the inside surface of the nozzle safe end, and the other end portion having threads sized to threadedly engage the thermal sleeve. A plurality of vanes extend from an inside surface of the spider shell to a spider center member. The spider center member includes an axial bore therethrough. The spider bore and the cruciform wedge bore are aligned and sized to receive the draw bolt.

The above described T-box assembly facilitates replacing the core spray line without removing the core spray nozzle safe end or draining the reactor. In addition, the T-box assembly facilitates attaching the core spray line to the safe end without welding.

DETAILED DESCRIPTION

Figure 1:
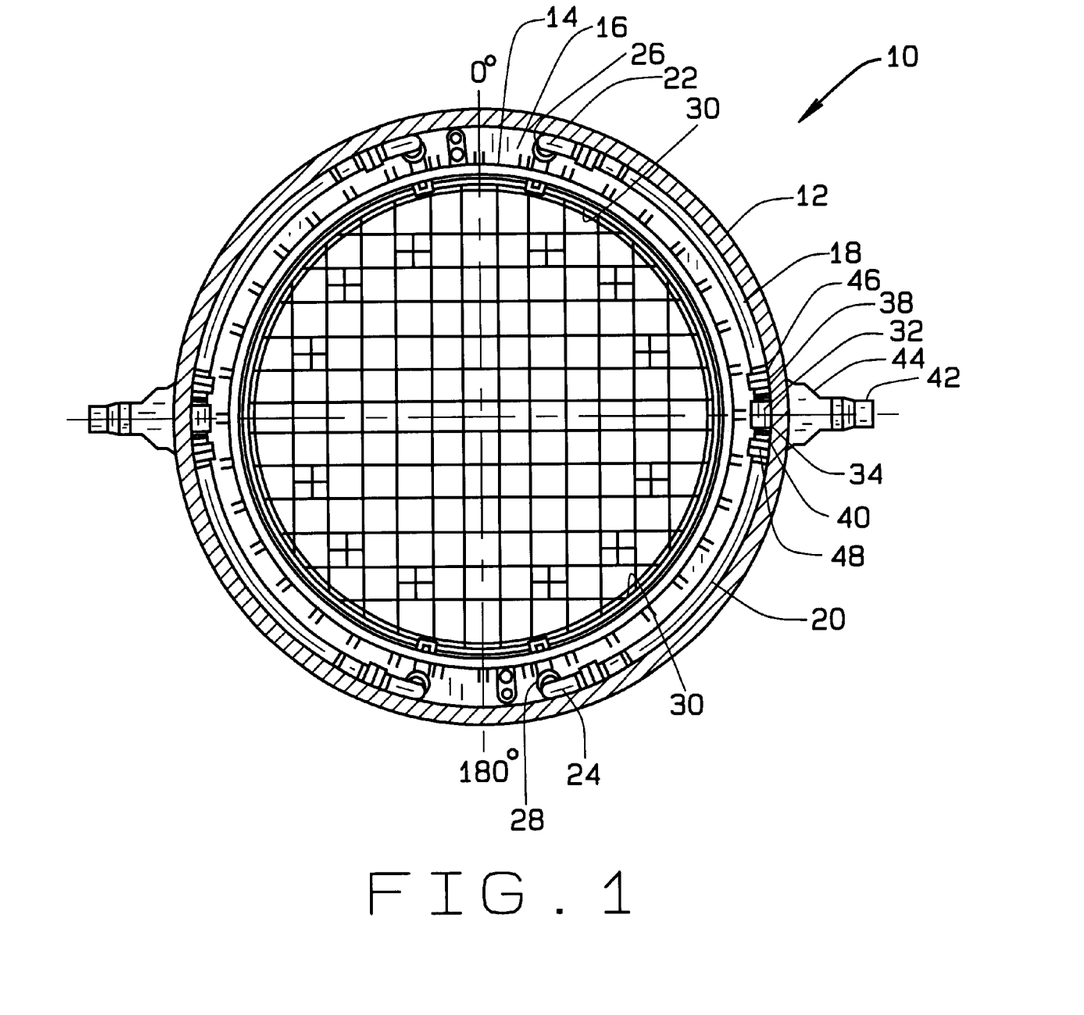
FIG. 1 is a top sectional view of a boiling water nuclear reactor pressure vessel illustrating a T-box assembly in accordance with one embodiment of the present invention.

FIG. 1 is a top sectional view of a boiling water nuclear reactor pressure vessel 10. Reactor pressure vessel 10 includes a vessel wall 12 and a shroud 14 which surrounds the reactor core (not shown) of pressure vessel 10. An annulus 16 is formed between vessel wall 12 and shroud 14. The space inside annulus 16 is limited with most reactor support piping located inside annulus 16.

Cooling water is delivered to the reactor core during a loss of coolant accident through core spray distribution header pipes 18 and 20 which are connected to downcomer pipes 22 and 24 respectively. Downcomer pipes 22 and 24 are connected to shroud 14 through lower T-boxes 26 and 28 respectively, which are attached to shroud 14 and internal spargers 30.

Distribution header pipes 18 and 20 diverge from an upper T-box assembly 32. Particularly, T-box 32 includes, in one embodiment, a T-box housing 34 having first, second, and third ends 36 (shown in FIG. 2), 38, and 40. First end 36 of T-box housing 34 is coupled to a safe end 42 of core spray nozzle 44 by a thermal sleeve 50 (shown in FIG. 2). Ends 38 and 40 are configured to be in substantial alignment and configured to couple to core spray line header pipes 18 and 20 respectively. Header pipes 18 and 20 are coupled to second and third ends 38 and 40 by pipe connectors 46 and 48 respectively. Pipe connectors 46 and 48 may be any pipe connectors known in the art, for example, ball flange connectors.

Figure 2:
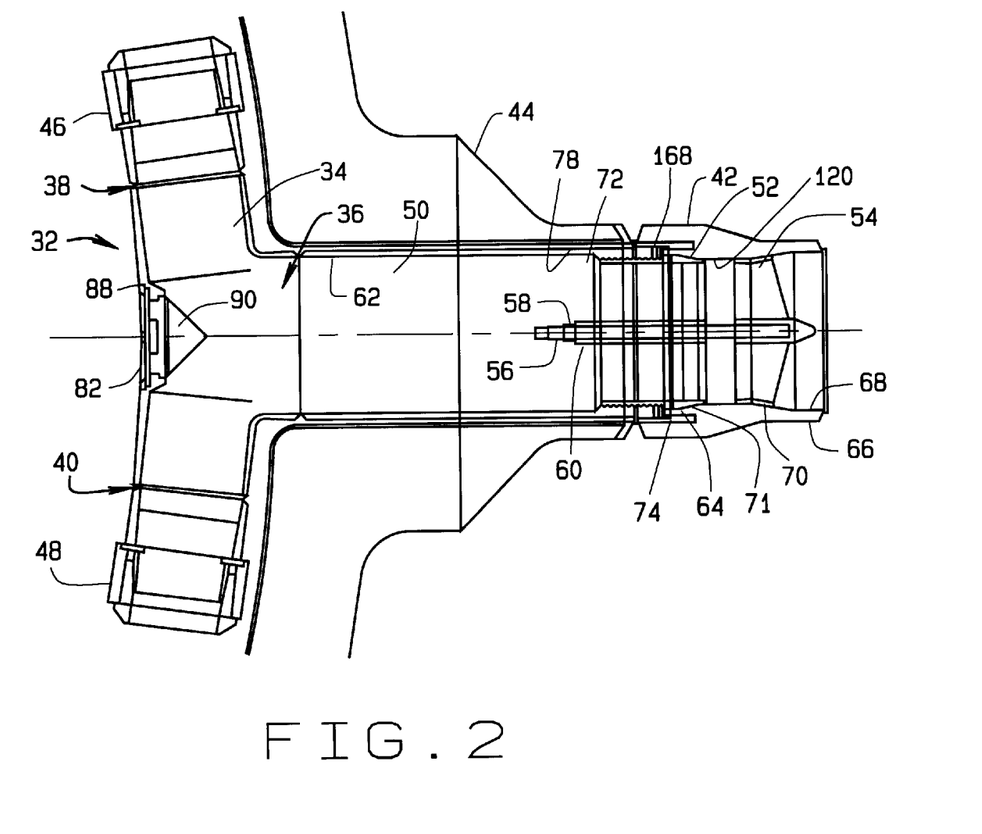
FIG. 2 is a sectional side view with parts cut away of the T-box assembly shown in FIG. 1.
Figure 3:
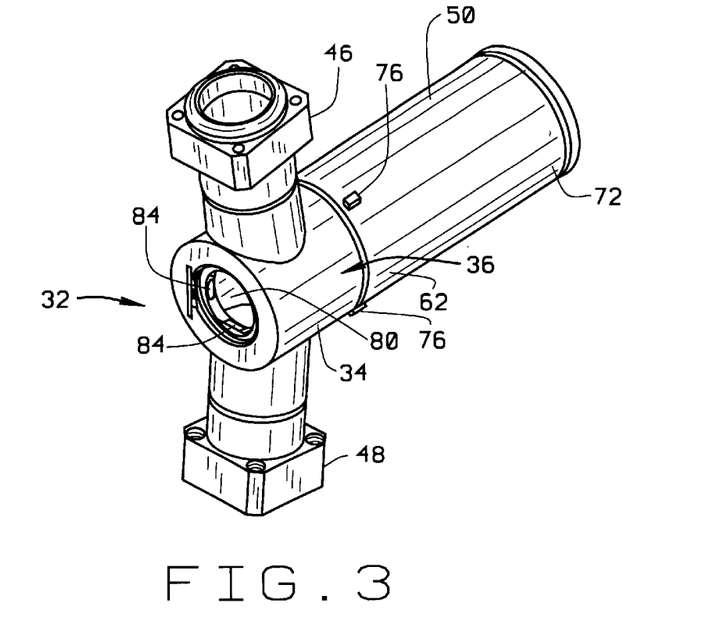
FIG. 3 is a perspective view of the T-box assembly shown in FIG. 1.
Figure 4:
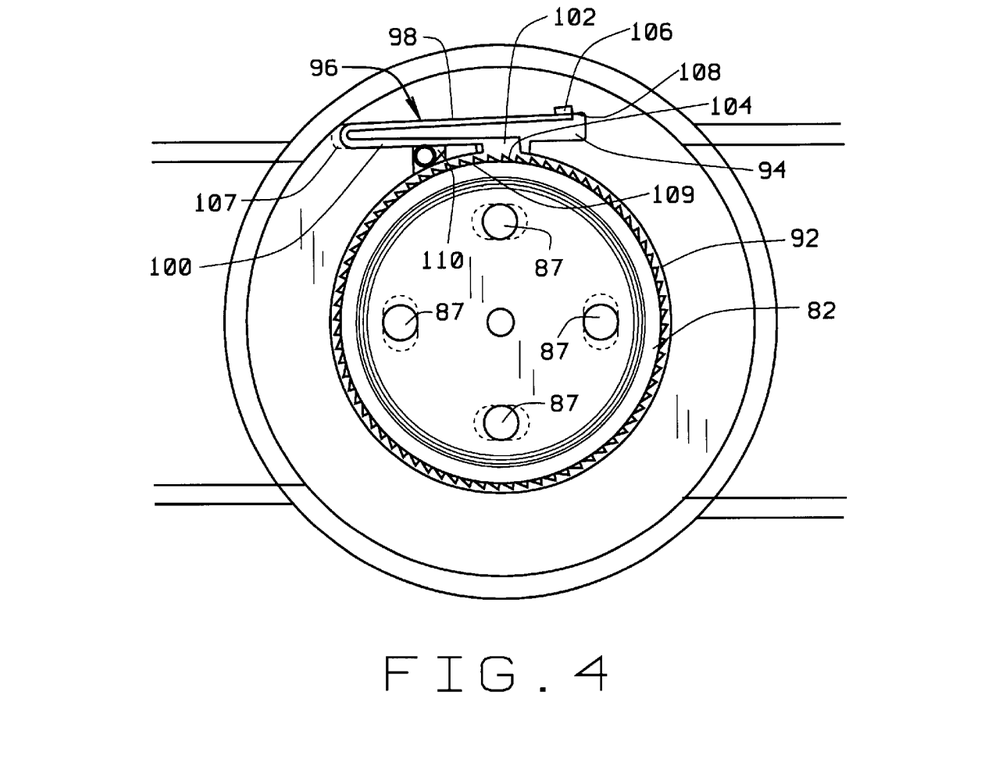
FIG. 4 is a back view of the T-box assembly shown in FIG. 1.

FIG. 2 is a sectional side view with parts cut away of T-box assembly 32, FIG. 3 is a perspective view of T-box assembly 32, and FIG. 4 is a back view of T-box assembly 32. In one embodiment, T-box assembly 32 includes in addition to T-box housing 34, a thermal sleeve 50, a spider 52, a cruciform wedge 54, a draw bolt 56, a draw bolt nut 58, and a nut keeper 60.

First end 36 of T-box housing 34 is welded to a first end 62 of thermal sleeve 50. T-box housing 34 is configured to be positioned so that thermal sleeve 50 is located inside core spray nozzle 44 and engages core spray nozzle safe end 42. Particularly, safe end 42 includes a first end 64, a second end 66, and a bore 68 extending between ends 64 and 66. Bore 68 includes a converging tapered portion 70 and a diverging tapered portion 71 located between ends 64 and 66. A second end 72 of thermal sleeve 50 is positioned adjacent first end 64 of core spray nozzle safe end 42. At least one spring washer 74 is located between first end 64 of safe end 42 and second end 72 of thermal sleeve 50. Spring washers 74 function as a mechanical seal to minimize leakage. Thermal sleeve 50 includes a plurality of positioning lugs 76 configured to engage core spray nozzle 44 to center T-box housing 34 in core spray nozzle bore 78.

Figure 5:
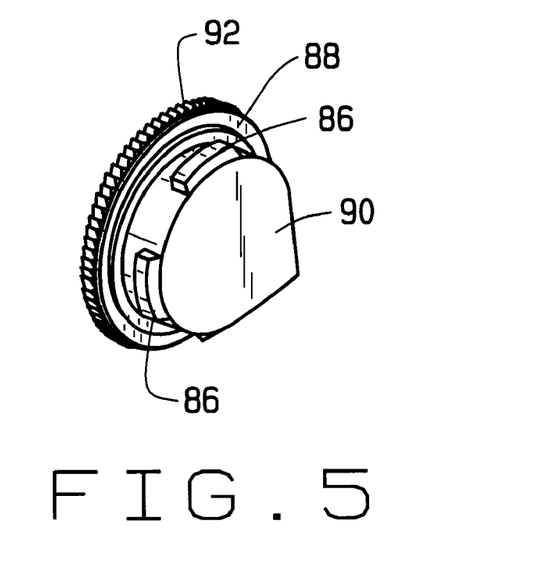
FIG. 5 is a perspective view of the cover plate shown in FIG. 4.

T-box housing 34 also includes a cover opening 80 that is in substantial alignment with first end 36, and is configured to receive a T-box cover plate 82. Specifically, T-box housing 34 includes a plurality of breach lock type lugs 84 located around cover opening 80, and T-box cover 82 include a plurality of breach lock type lugs 86 sized and located to mesh and engage lugs 84 to capture cover 82. Tool engagement recesses 87 are sized to receive a cover installation tool (not shown). Referring also to FIG. 5, T-box cover 82 includes a head portion 88 and an insertion portion 90. Breach lock lugs 86 extend from the periphery of insertion portion 90. A plurality of ratchet teeth 92 extend around the periphery of head portion 88.

Figure 6:
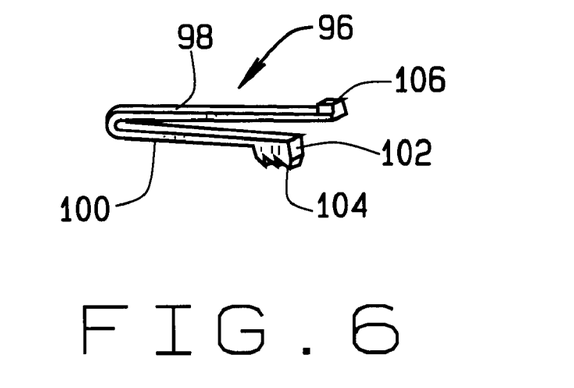
FIG. 6 is a perspective view of the lock spring shown in FIG. 4.

T-box housing 34 further includes a recess 94 located adjacent cover opening 80. Recess 94 is sized and shaped to receive a lock spring 96. Referring also to FIG. 6, lock spring 96 includes lever arms 98 and 100, and an engagement portion 102 extending from lever arm 100. A plurality of ratchet teeth 104 extend from engagement portion 102. Lock spring ratchet teeth 104 are sized to mesh with cover plate ratchet teeth 92 to prevent cover 82 from loosening. A tab 106 extends from lever arm 98. Recess 94 includes under cut portions 107, 108, and 109. Tab 106 is captured in an under cut portion 108, the junction of spring arms 98 and 100 is captured in undercut 107, and a portion of spring arm 100 adjacent engagement portion 102 is captured in under cut 109 to maintain lock spring 96 in recess 94. A cam tool 110 is movable so as to disengage engagement portion ratchet teeth 104 from cover plate ratchet teeth 92 to permit cover 82 to be opened and removed. Lock spring 96 by deflecting lever arms 98 and 100 and positioning lock spring 96 in recess 94. Lock spring 96 is then translated so as to position lock spring 96 under undercut portions 107 and 109, and tab 106 springs into position in undercut portion 108.

Figure 7:
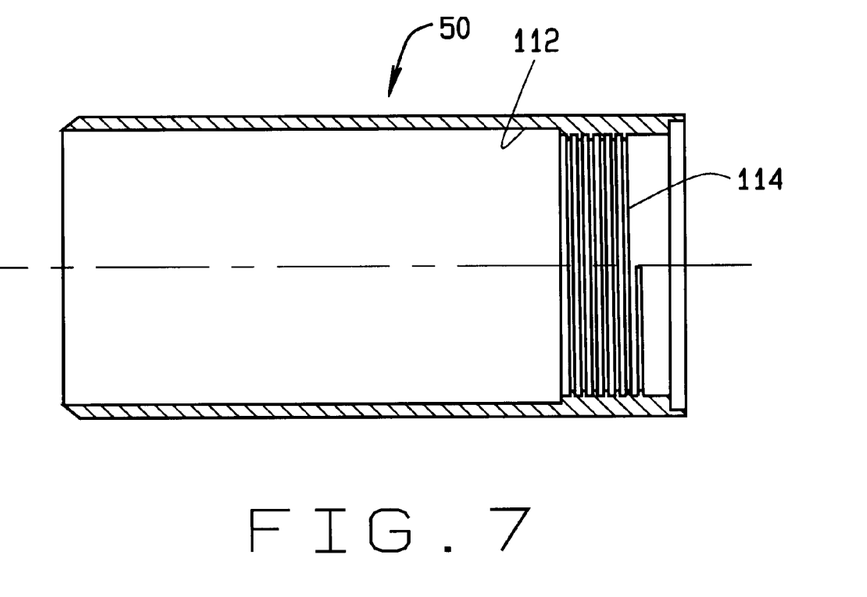
FIG. 7 is a sectional side view of the thermal sleeve shown in FIG. 2.

FIG. 7 is a sectional side view of thermal sleeve 50. An inner surface 112 of thermal sleeve 50 includes threads 114 at second end 72.

Figure 8:
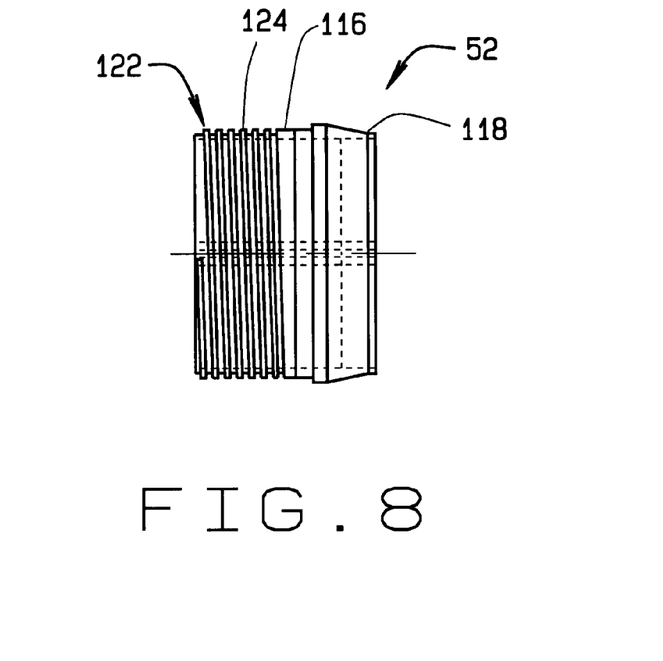
FIG. 8 is a side view of the spider shown in FIG. 2.
Figure 9:
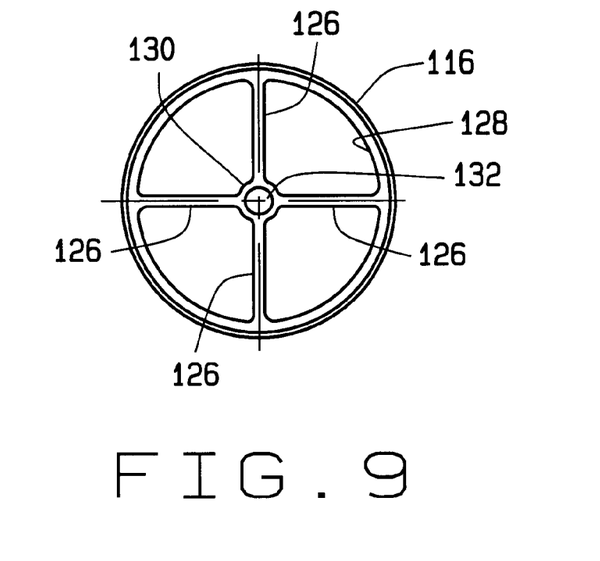
FIG. 9 is a top view of the spider shown in FIG. 2.

FIG. 8 is a side view of spider 52, and FIG. 9 is a top view of spider 52. Referring also to FIG. 2, spider 52 includes a cylindrical shell 116 with a first end portion 118 is tapered to engage inside surface 120 of nozzle safe end bore diverging tapered portion 71. A second end portion 122 of shell 116 includes external threads 124 sized to threadedly engage threads 114 of thermal sleeve 50. Vanes 126 extend from an inside surface 128 of spider shell 116 to a spider center member 130. Spider center member 130 includes an axial bore 132 extending from first end 118 to second end 122 of shell 116. Axial bore 132 is sized to receive draw bolt 56.

Figure 10:
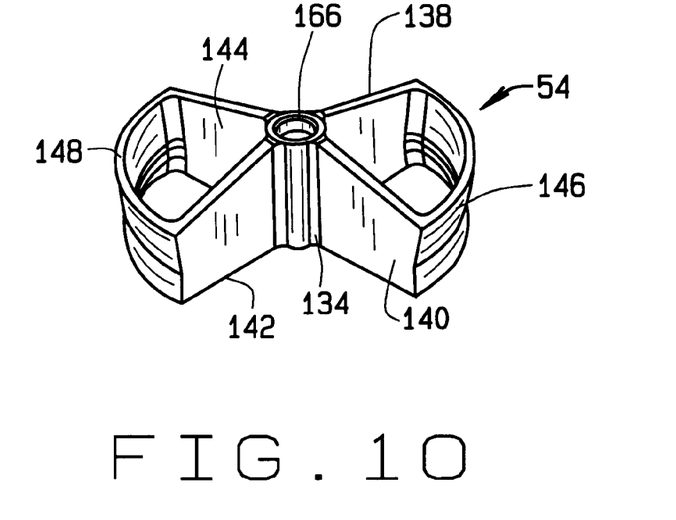
FIG. 10 is a perspective view of the cruciform wedge shown in FIG. 2.
Figure 11:
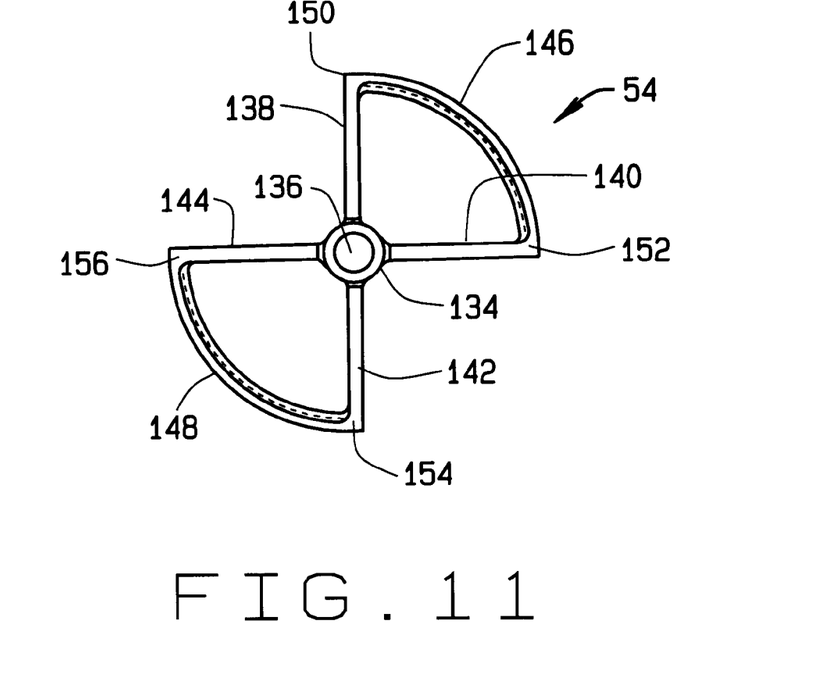
FIG. 11 is a top view of the cruciform wedge shown in FIG. 2.

FIG. 10 is a perspective view of cruciform wedge 54, and FIG. 11 is a top view of cruciform wedge 54. Referring also to FIG. 2, cruciform wedge 54 includes central member 134 having bore 136 extending therethrough. First, second, third and fourth web members 138, 140, 142, and 144 extend from central member 134. Web members 138, 140, 142, and 144 form an X shaped configuration. Support members 146 and 148 extend between ends 150, 152, 154, and 156 of adjacent web members 138, 140, 142, and 144. Particularly, support member 146 extends between first and second web members 138 and 140, and support member 148 extends between third and fourth web members 142 and 144. Support members 146 and 148 are tapered to engage inside surface 120 of nozzle safe end bore tapered portion 70. Additionally, web members 138, 140, 142, and 144 are contoured to minimize flow resistance.

Figure 12:
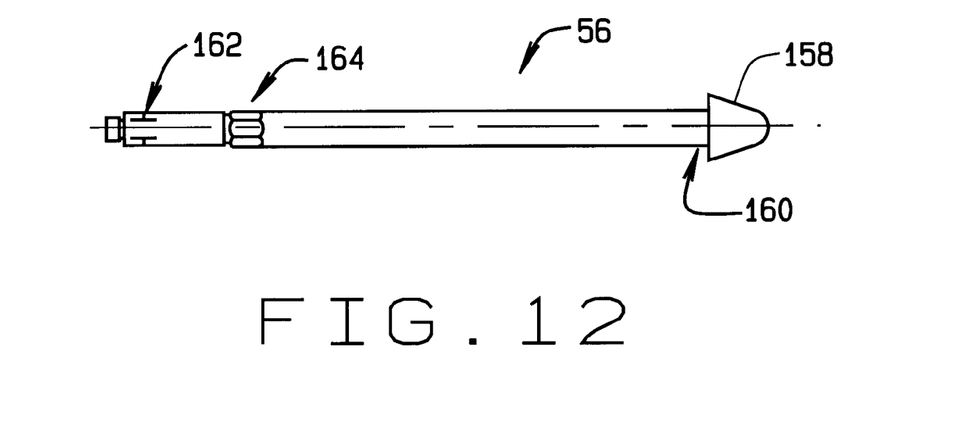
FIG. 12 is a side view of the draw bolt shown in FIG. 2.

FIG. 12 is a side view of draw bolt 56. Referring also to FIG. 2, draw bolt 56 extends through bore 136 of a central member 134 of cruciform wedge 54 and bore 132 of spider 52. Draw bolt 56 includes a cap portion 158 located at a first end 160. Cap portion 158 is larger than the diameter of bore 136 through central member 134 of cruciform wedge 54. A second end 162 of draw bolt 56 is threaded to threadedly engage draw bolt nut 58 (see FIG. 2). An adjacent section 164 has a hexagonal contour. Hexagonal section 164 interfaces with a mating hexagonal shaped bore of keeper 60 (see FIG. 2) to prevent draw bolt nut 58 from loosening. Cap portion 158 has a spherical radius that interfaces with a spherical seat 166 in cruciform wedge 54. This permits spider 52, and thermal sleeve 50 to articulate about spherical seat 166 which ensures that first end 62 of thermal sleeve 50 is concentric with core spray nozzle bore 78.

To replace a core spray line in nuclear reactor pressure vessel 10, the existing T-box/thermal sleeve combination is removed from core spray nozzle safe end 42 by any suitable method, for example, roll cutting, conventional underwater plasma arc cutting, and/or electric discharge machining (EDM). Typically, a small portion of end 64 of safe end 42 is also removed. First end 64 is then prepared, usually by EDM, to mate with second end 72 of thermal sleeve 50 with spring washers 74 disposed therebetween.

T-box assembly 32 is used to connect core spray lines 18 and 20 to safe end 42 of core spray nozzle 44 by coupling first end 36 of T-box housing 34 to safe end 42 with thermal sleeve 50 and coupling ends 38 and 40 to core spray distribution header pipes 18 and 20. Particularly, to couple first end 36 of the T-box housing 34 to safe end 42, first end 36 is welded to first end 62 of thermal sleeve 50. Spider 52 is attached to second end 72 of thermal sleeve 50 by threadedly engaging spider external threads 124 with thermal sleeve internal threads 114. This threaded connection provides for ease of fabrication and a means of varying very precisely the gap between second end 72 of thermal sleeve 50 and safe end first end 64. Once established this gap can be maintained by installing a dowel pin 168 (See FIG. 2) in spider 52 and thermal sleeve 50 to prevent relative rotation. Two series stacked spring washers 74 are positioned in the gap between safe end 42 and thermal sleeve 50. As draw bolt 56 is tensioned, spring washers 74 are compressed between thermal sleeve 50 and safe end 42. The compression of spring washers 74 is limited by the fact that first end portion 118 of spider 52 bears against diverging portion 71 of safe end bore 68.

Cruciform wedge 54 and draw bolt 56 are inserted into safe end bore 68. Cruciform wedge 54 is configured with webs 138, 140, 142, and 144 in an X-shaped configuration and only two support members 146 and 148 connecting web members 138,140,142, and 144 to permit wedge 54 to be inserted into safe end bore 58. Wedge 54 is inserted in an orientation that positions the axis of bore 136 of central member 134 of wedge 54 perpendicular to the axis of bore 68 of nozzle safe end 42. Wedge 54 is then tilted so as to move central member bore 136 into co-axial alignment with safe end bore 68, and support members 146 and 148 into engagement with tapered portion 70 of safe end bore 68.

Draw bolt 56 is then inserted through bore 136 of wedge central member 134 and bore 132 of spider 52 with threaded end 162 of draw bolt 56 extending away from safe end 42 and towards T-box housing 34. This may be accomplished by attaching a stainless steel cable or wire rope, of about 3 to 5 millimeters in diameter, (not shown) to threaded end 162 of bolt 56 and threading the cable through wedge central member bore 136 and spider bore 132 before inserting wedge 54 and draw bolt 56 into safe end 42. After wedge 54 has been tilted to its operational position the wire may be pulled through central member bore 136 which in turn pulls threaded end 162 of draw bolt 56 through wedge bore 136 and spider bore 132 and into position with cap portion 158 of bolt 56 engaging spherical seat 164 of wedge 54. Draw bolt nut 58 is then tightened and nut keeper 60 is attached to lock nut 58 to prevent loosening. Keeper 60 interfaces with hexagonal section 164 of draw bolt 56 to prevent rotation draw bolt nut 58 relative to bolt 56.

Consequently, T-box housing 34 is positioned with thermal sleeve positioning lugs 76 engaging the inside surface of core spray nozzle 44 and second end 72 of thermal sleeve 50 compressing spring washers 74 against safe end first end 64. T-box cover plate 82 is then inserted in cover opening 80 with breach lock lugs 84 engaging breach lock lugs 86. Cover plate 82 is tightened with lock spring ratchet teeth 104 engaging cover ratchet teeth 92 to prevent cover 82 from loosening. Core spray header pipes 18 and 20 are then coupled to ends 38 and 40 of T-box housing 34 to complete the installation.

The above described T-box assembly 32 facilitates replacing core spray lines 18 and 20 without removing core spray nozzle safe end 42 or draining reactor 10. In addition T-box assembly 32 facilitates attaching core spray lines 18 and 20 to safe end 42 without welding.

While the invention has been described in terms of various specific embodiments, those skilled in the art will recognize that the invention can be practiced with modification within the spirit and scope of the claims.

What is claimed is:

1. A T-box assembly for attachment to a core spray nozzle safe end in a boiling water nuclear reactor pressure vessel, the safe end including a first end and a second end, and a bore extending from the first end to the second end of the nozzle safe end, said T-box assembly comprising:

a T-box housing;

a thermal sleeve having a first end and a second end, said first end of said thermal sleeve coupled to said T-box housing;

a cruciform wedge configured to engage a surface of the bore of the core spray nozzle safe end;

a spider having a first end and a second end, said first end threadedly engaging said thermal sleeve at said second end; and a draw bolt coupling said cruciform wedge and said spider.

2. A T-box assembly in accordance with claim 1 wherein said T-box housing comprises a first end, a second end, a third end, and a cover opening, said first and second ends in substantial alignment and configured to couple to a first and a second core spray header pipe respectively, said third end coupled to said first end of said thermal sleeve, said cover opening in substantial alignment with said third end of said T-box housing, said T-box housing further comprising a plurality of breach lock lugs extending into said cover opening.

3. A T-box assembly in accordance with claim 2 further comprising a T-box cover plate configured to couple to said T-box housing, said cover plate comprising a head portion and an insertion portion, said insertion portion comprising a plurality of breach lock lugs extending from the periphery of said insertion portion, said insertion portion breach lock lugs sized and located to mesh with said T-box housing breach lock lugs to capture said cover in place.

4. A T-box assembly in accordance with claim 3 wherein said head portion of said cover plate comprises a plurality of ratchet teeth extending around the periphery of said head portion.

5. A T-box assembly in accordance with claim 4 wherein said T-box housing further comprises a recess located adjacent said cover opening, said recess sized and shaped to receive a lock spring.

6. A T-box assembly in accordance with claim 5 wherein said lock spring comprises an engagement portion, said engagement portion comprising a plurality of ratchet teeth sized to mesh with said cover plate ratchet teeth.

7. A T-box assembly in accordance with claim 1 wherein said cruciform wedge comprises:

a central member having a bore therethrough;

a first, a second, a third, and a fourth web member extending from said central member, said web members forming an X shaped configuration;

a first support member extending between first ends of said first and second web members; and a second support member extending between first ends of said third and fourth web members, said first and second support members configured to engage the bore of the safe end.

8. A T-box assembly in accordance with claim 7 wherein said draw bolt comprises a first end, a second end, and a draw bolt nut, said first end comprising a cap portion having a larger diameter than the diameter of said bore through said central member of said cruciform wedge, said second end comprising threads, and sized to threadedly engage said draw bolt nut.

9. A T-box assembly in accordance with claim 1 wherein said spider comprises a cylindrical shell having a first end portion and a second end portion, said first end portion configured to engage the inside surface of the nozzle safe end, said second end portion comprising threads sized to threadedly engage said thermal sleeve.

10. A T-box assembly in accordance with claim 9 wherein said spider shell comprises a plurality of vanes extending from an inside surface of said shell, said plurality of vanes extending from said shell inside surface to a spider center member, said spider center member comprising an axial bore therethrough.

11. A T-box assembly in accordance with claim 1 further comprising at least one spring washer, said at least one spring washer configured to be located between said second end of said thermal sleeve and the first end of a core spray nozzle safe end.

12. A core spray line assembly for a reactor pressure vessel in a nuclear reactor, said core spray line assembly comprising:
a T-box assembly and a core spray nozzle safe end comprising a first end, a second end, and a bore extending between said first and second ends, said T-box assembly comprising:
a T-box housing;
a thermal sleeve having a first end and a second end, said first end of said thermal sleeve coupled to said T-box housing;
a cruciform wedge configured to engage an inside surface of said bore of said core spray nozzle safe end;
a spider having a first end and a second end, said first end threadedly engaging said thermal sleeve at said second end; and
a draw bolt coupling said cruciform wedge and said spider.

13. A core spray line assembly in accordance with claim 12 wherein said T-box housing comprises a first end, a second end, a third end, and a cover opening, said first and second ends in substantial alignment and configured to couple to a first and a second core spray header pipe respectively, said third end coupled to said first end of said thermal sleeve, said cover opening in substantial alignment with said third end of said T-box housing, said T-box housing further comprising a plurality of breach lock lugs extending into said cover opening.

14. A core spray line assembly in accordance with claim 13 further comprising a T-box cover plate configured to couple to said T-box housing, said cover plate comprising a head portion and an insertion portion, said insertion portion comprising a plurality of breach lock lugs extending from the periphery of said insertion portion, said insertion portion breach lock lugs sized and located to mesh with said T-box housing breach lock lugs to capture said cover in place.

15. A core spray line assembly in accordance with claim 14 wherein said head portion of said cover plate comprises a plurality of ratchet teeth extending around the periphery of said head portion.

16. A core spray line assembly in accordance with claim 15 wherein said T-box housing further comprises a recess located adjacent said cover opening, said recess sized and shaped to receive a lock spring.

17. A core spray line assembly in accordance with claim 16 wherein said lock spring comprises an engagement portion, said engagement portion comprising a plurality of ratchet teeth sized to mesh with said cover plate ratchet teeth.

18. A core spray line assembly in accordance with claim 12 wherein said cruciform wedge comprises:
a central member having a bore therethrough;
a first, a second, a third, and a fourth web member extending from said central member, said web members forming an X shaped configuration;
a first support member extending between first ends of said first and second web members; and
a second support member extending between first ends of said third and fourth web members, said first and second support members configured to engage the inside surface of said bore of said safe end.

19. A core spray line assembly in accordance with claim 18 wherein said draw bolt comprises a first end, a second end, and a draw bolt nut, said first end comprising a cap portion having a larger diameter than the diameter of said bore through said central member of said cruciform wedge, said second end comprising threads, and sized to threadedly engage said draw bolt nut.

20. A core spray line assembly in accordance with claim 12 wherein said spider comprises a cylindrical shell having a first end portion and a second end portion, said first end portion configured to engage said inside surface of said nozzle safe end, said second end portion comprising threads sized to threadedly engage said thermal sleeve.

21. A core spray line assembly in accordance with claim 20 wherein said spider shell comprises a plurality of vanes extending from an inside surface of said shell, said plurality of vanes extending from said shell inside surface to a spider center member, said spider center member comprising an axial bore therethrough.

22. A core spray line assembly in accordance with claim 12 further comprising at least one spring washer, said at least one spring washer located between said second end of said thermal sleeve and said first end of said core spray nozzle safe end.

* * * * *